United States Patent
Porten et al.

(10) Patent No.: US 11,457,062 B2
(45) Date of Patent: Sep. 27, 2022

(54) CLIENT-SERVER SYSTEM AND TERMINAL

(71) Applicant: DATENLOTSEN INFORMATIONSSYSTEME GMBH, Hamburg (DE)

(72) Inventors: Dominik Porten, Norderstedt (DE); Stephan Sachse, Hamburg (DE)

(73) Assignee: DATENLOTSEN INFORMATIONSSYSTEME GMBH, Hamburg (DE)

( * ) Notice: Subject to any disclaimer, the term of this patent is extended or adjusted under 35 U.S.C. 154(b) by 595 days.

(21) Appl. No.: 15/318,977

(22) PCT Filed: Jun. 3, 2015

(86) PCT No.: PCT/DE2015/100219
§ 371 (c)(1),
(2) Date: Dec. 15, 2016

(87) PCT Pub. No.: WO2015/192830
PCT Pub. Date: Dec. 23, 2015

(65) Prior Publication Data
US 2017/0149872 A1    May 25, 2017

(30) Foreign Application Priority Data

Jun. 17, 2014 (DE) ............. 10 2014 108 483.7

(51) Int. Cl.
*H04L 67/1001* (2022.01)
*G06F 9/50* (2006.01)
*H04L 67/01* (2022.01)

(52) U.S. Cl.
CPC ........ *H04L 67/1001* (2022.05); *G06F 9/5005* (2013.01); *G06F 9/5061* (2013.01); *H04L 67/01* (2022.05)

(58) Field of Classification Search
CPC ... H04L 67/1002; H04L 67/42; G06F 9/5005; G06F 9/5061
USPC ......................................................... 709/203
See application file for complete search history.

(56) References Cited

U.S. PATENT DOCUMENTS

| | | | | |
|---|---|---|---|---|
| 5,483,652 A | * | 1/1996 | Sudama | G06F 16/2246 709/201 |
| 5,522,070 A | * | 5/1996 | Sumimoto | G06F 9/4881 709/226 |
| 6,704,489 B1 | * | 3/2004 | Kurauchi | H04N 5/765 386/248 |

(Continued)

OTHER PUBLICATIONS

M. Aron et al.: "Cluster Reserves: A Mechanism for Resource Management in Cluster-based Network Servers", Proceedings of the ACM Sigmetrics International Conference on Measurement and Modeling of Computer Systems, vol. 28, No. 1, pp. 90-101 (2000).

(Continued)

*Primary Examiner* — Madhu Woolcock
(74) *Attorney, Agent, or Firm* — Norman B. Thot

(57) ABSTRACT

A client-server system includes a server, at least one of a first client and a second client, and server-side computer resources which are attributed to the at least one of a first client and a second client so as to implement a server-side multitasking. The at least one of a first client and a second client distribute the server-side computer resources input-dependently so as to implement a client-side and input-dependent multitasking.

12 Claims, 2 Drawing Sheets

(56) References Cited

U.S. PATENT DOCUMENTS

| | | | | |
|---|---|---|---|---|
| 6,820,130 B1* | 11/2004 | Miyamoto | H04L 67/42 | 709/219 |
| 8,091,088 B2* | 1/2012 | Kishan | G06F 9/485 | 718/104 |
| 8,306,036 B1* | 11/2012 | Bollay | H04L 47/781 | 370/395.41 |
| 8,417,817 B1* | 4/2013 | Jacobs | H04L 69/28 | 340/1.1 |
| 8,433,771 B1* | 4/2013 | Ellsworth | H04L 67/125 | 709/213 |
| 8,694,639 B1* | 4/2014 | Vermeulen | G06F 9/5011 | 709/226 |
| 8,949,429 B1* | 2/2015 | Chuang | G06F 9/50 | 709/224 |
| 8,966,112 B1* | 2/2015 | Franke | H04L 69/321 | 370/229 |
| 9,317,329 B2* | 4/2016 | Tejaswini | G06F 9/5011 |  |
| 9,485,323 B1* | 11/2016 | Stickle | H04L 67/32 |  |
| 9,953,351 B1* | 4/2018 | Sivasubramanian | G06Q 30/0283 |  |
| 2004/0044648 A1* | 3/2004 | Anfindsen | G06Q 10/06 |  |
| 2004/0230675 A1* | 11/2004 | Freimuth | H04L 29/06 | 709/223 |
| 2005/0036443 A1* | 2/2005 | Collins | G06F 8/60 | 370/216 |
| 2005/0235289 A1* | 10/2005 | Barillari | G06F 9/50 | 718/100 |
| 2006/0064465 A1* | 3/2006 | Fuerst | G06F 17/30557 | 709/214 |
| 2006/0184626 A1* | 8/2006 | Agapi | G06F 9/505 | 709/205 |
| 2007/0050477 A1* | 3/2007 | Isaacs | H04L 67/02 | 709/219 |
| 2008/0040682 A1* | 2/2008 | Sorenson | G06F 3/04817 | 715/777 |
| 2011/0016178 A1* | 1/2011 | Palmieri | G06F 17/30905 | 709/204 |
| 2011/0022712 A1* | 1/2011 | Numaoka | G06F 9/505 | 709/226 |
| 2012/0203578 A1 | 8/2012 | Baggett et al. | | |
| 2013/0046873 A1* | 2/2013 | O | H04L 65/403 | 709/223 |
| 2015/0089034 A1* | 3/2015 | Stickle | H04L 41/00 | 709/223 |
| 2015/0212856 A1* | 7/2015 | Shanmuganathan | G06F 9/5027 | 709/226 |
| 2015/0326498 A1* | 11/2015 | Sweeney | H04L 47/822 | 709/225 |

OTHER PUBLICATIONS

H. Zhu et al.: "Demand-driven Service Differentiation in Cluster-based Network Servers", IEEE INFOCOM, vol. 2, pp. 679-688 (2001).

* cited by examiner

CLIENT-SERVER SYSTEM AND TERMINAL

CROSS REFERENCE TO PRIOR APPLICATIONS

This application is a U.S. National Phase application under 35 U.S.C. § 371 of International Application No. PCT/DE2015/100219, filed on Jun. 3, 2015 and which claims benefit to German Patent Application No. 10 2014 108 483.7, filed on Jun. 17, 2014. The International Application was published in German on Dec. 23, 2015 as WO 2015/192830 A1 under PCT Article 21(2).

FIELD

The present invention relates to a client-server system with a server, and at least one client and a second client, wherein server-side computer resources are attributed to the first client and to the second client so that in particular a server-side multi-tasking is achieved. The present invention also relates to a terminal.

BACKGROUND

Modern management systems are in particular based on the use of databases. These databases must be maintained and serve to analyze and process certain processes and jobs. Such systems are mostly operated in a client-server configuration since the databases, or more precisely, the underlying database systems, mostly operate on high-performance computer systems and users mostly possess only ordinary computers or terminals.

In such a client-server configuration, the individual clients make requests to the server, which then processes or transmits them and returns the corresponding result to the clients.

More specifically, a client is always attributed to one user. The consequence thereof can be that the client is unable to continue working with the database system when the client makes larger requests to the server. For example, performing a statistical analysis in a university management system requires high computing capabilities so that the server cannot pursue operations at the usual level once the client has made its request.

SUMMARY

An aspect of the present invention is to provide an improvement with respect to the prior art.

In an embodiment, the present invention provides a client-server system which includes a server, at least one of a first client and a second client, and server-side computer resources which are attributed to the at least one of a first client and a second client so as to implement a server-side multitasking. The at least one of a first client and a second client distribute the server-side computer resources input-dependently so as to implement a client-side and input-dependent multitasking.

BRIEF DESCRIPTION OF THE DRAWINGS

The present invention is described in greater detail below on the basis of embodiments and of the drawings in which.

DETAILED DESCRIPTION

Figure 1:
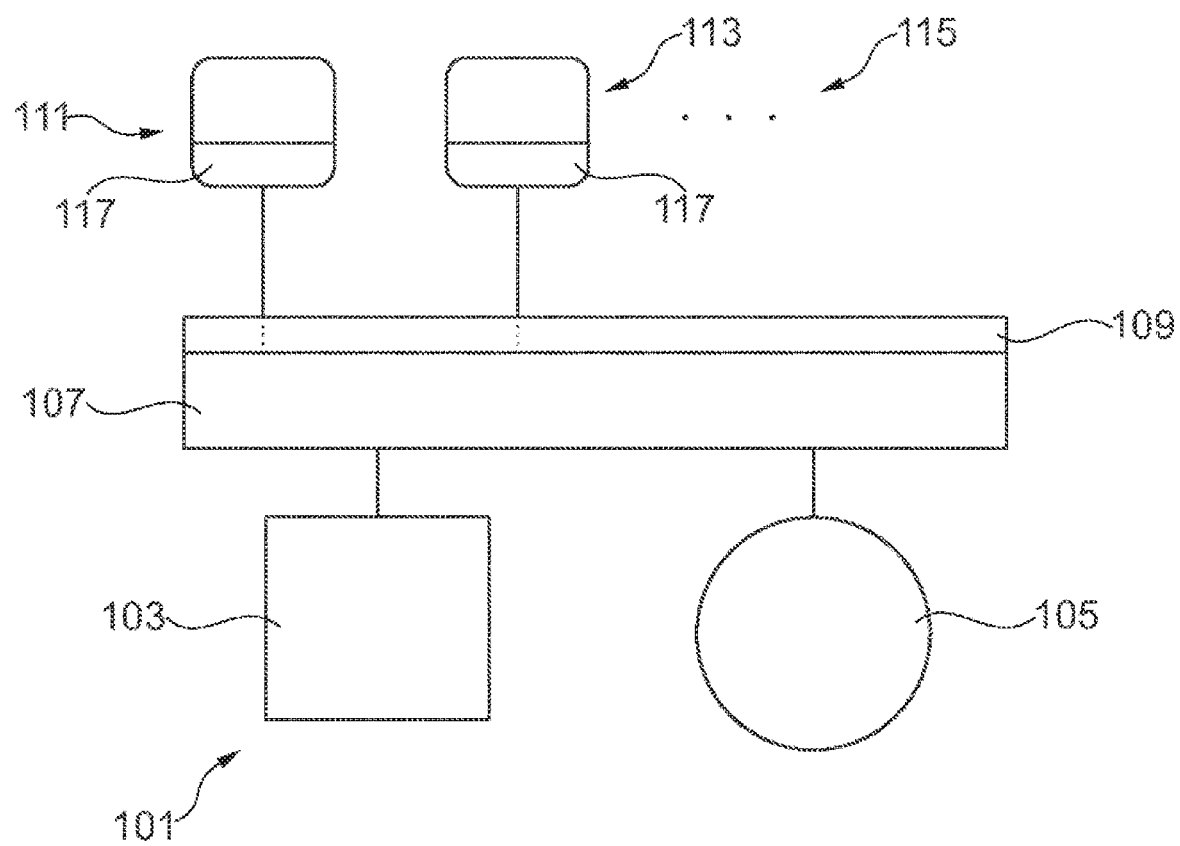
FIG. 1 shows a schematic representation of a client-server model.
Figure 2:
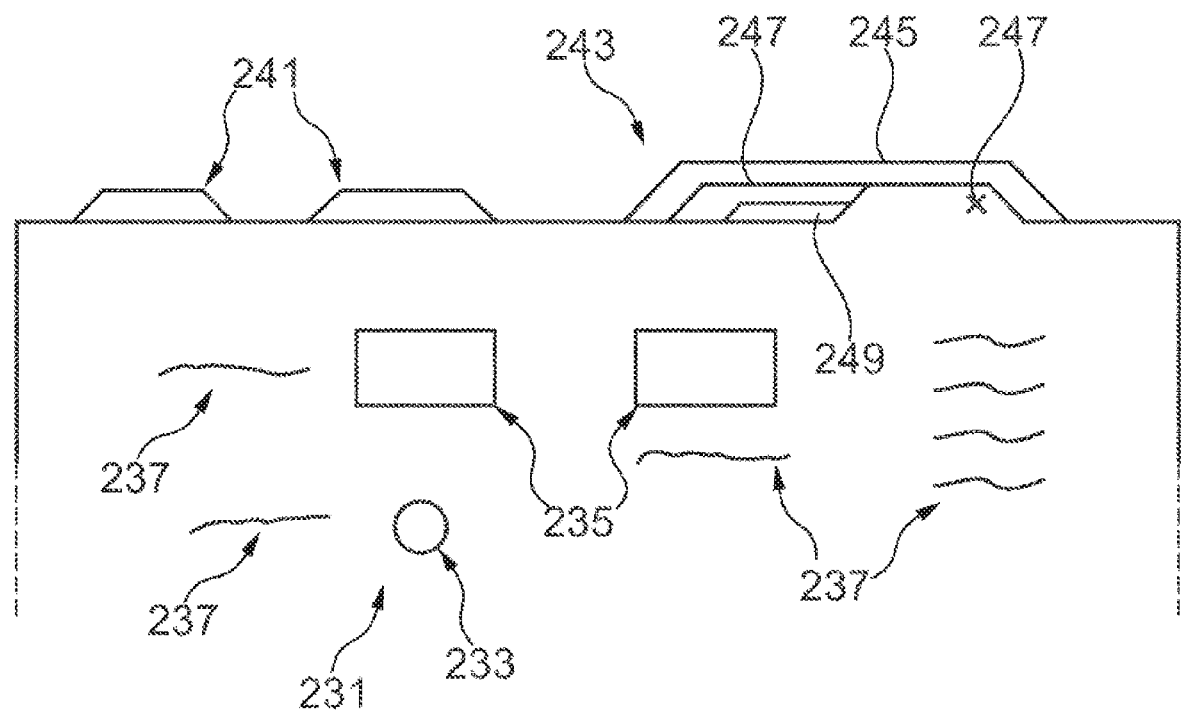
FIG. 2 shows a tab-family structure for a university management software program.

In an embodiment, the present invention provides a client-server system with a server, and at least one client and a second client, wherein server-side computer resources are attributed to the first client and to the second client so that in particular server-side multi-tasking is achieved, wherein the first and/or the second client input-dependently divides or divide the server-side computer resources attributed to the client, so as to implement client-side and input-dependent multitasking, in particular pre-emptive multitasking.

Clients operating, in particular, on terminals with limited computer power, can thereby execute other operations in spite of time-consuming queries. This means that an operator operating a client does not have to wait until a current job or a current process is completed, but can correspondingly perform additional jobs and processes and, for example, maintain database fields or make further requests.

This more specifically allows for a modified parallel operation of a client. It also opens up new possibilities for client-side representation of processes and jobs and for client-side operations in a client-server system.

The following terms must be explained:

A "client-server system" is an installation which implements a client-server model through computer and network technology. Such a client-server model describes the possibility of distributing jobs and services within a network. The jobs are executed in particular by programs, which are divided in clients and a server. The client can request a service from the server (for example, an operating resource), in particular on demand. The server, which is located on the same or on any other computer in the network, replies to the requests, for example, by providing the requested operating resources.

The client-server system here more specifically comprises a central database server or several peripheral database servers, wherein the several peripheral database servers can be managed by "a central server".

"Computer resources", also called "operating resources", in particular include the computing power of a processor, a co-processor and/or a graphics processor, as well as storage resources, wherein the computing resources may be provided in a central computer, a peripheral computer system, or in the cloud.

"Server-side" refers to computing resources that are not provided by the client.

"Multitasking", also referred to as "multi-process operation", is here in particular the ability to execute several jobs or services (tasks) virtually concurrently. A processor generally provides the supporting hardware structures required therefor, but can here also be provided by a computer or by several distributed computers. The various tasks/jobs are more specifically activated alternately at very short intervals, thus giving the impression of simultaneousness (concurrence). Multitasking is here thus mainly used as a synonym for time-division multiplexing.

In the present application, a truly simultaneous processing of jobs can take place when a computer has several CPU cores or when several computers with several CPU cores are used for the individual tasks. This will in parts be referred to as multi-processing, although it is included in the term multitasking.

Pre-emptive multitasking is in particular included. Pre-emptive multitasking involves the processing of individual processes, jobs and/or tasks by a load dispatcher, which is also called a scheduler. The load dispatcher can more specifically be a part of the operating system or be implemented in the server. Each job or each service is interrupted after a certain processing time during pre-emptive multitasking.

The terms "time slot" or "time slice" are used in this context. When a process is interrupted, it is inactive and other processes are processed where necessary. As soon as computer resources are attributed to the "sleeping" process, it continues its work and is active. In this process, the time slot can be attributed constantly or priority-dependent, so that the time slots can have different lengths.

"Input-dependent" here means that server-side computer resources attributed to the client in accordance with the services requested by the client are divided depending on client-side inputs. For example, a statistical analysis may be provided by analysing databases stored in the server or managed by the server. Since such an analysis generally represents a higher processing and calculation workload than, for example, a simple request for a piece of information in the database, 80%, for example, of the attributed server-side calculation resources may be used for this analysis. The residual 20% can then be used, for example, for simple requests or entries into the database.

The present invention thus more specifically relates to a system, to a doubled downstream multitasking in a client-server-system, in which client-side multitasking is controlled by the client and server-controlled multitasking is implemented by the server.

In an embodiment of the present invention, the client-server system can, for example, comprise additional clients to which server-side resources are attributed and to which server-side computer resources are divided input-dependently.

Several clients can thus be made available in the client-server system which respectively allow an operator to conduct quasi-parallel operations.

In order for a client to be able to process different jobs or applications on the server side, one of the clients can be set up so that a service or several, in particular different, services of the server can be called up directly and/or indirectly.

"Services" refer to all jobs, tasks and processes which use computer resources. This in particular includes database queries, database modifications, database analyses, saving data, modification of database information, print orders, send orders, creating templates, scanning documents, or the like.

A "direct" call refers to a service that is directly called up by the client and processed by the database system.

An "indirect" call refers to diverted services or services which are sent, for example, to an intermediate layer, such as, for example, to an XPA layer, and which thus act on the database via the intermediate layer. Such an intermediate layer can more specifically form the "entire server".

In an embodiment of the present invention, the server can, for example, include a database or several databases and/or a database system or several database systems. The client can thus more specifically manipulate, analyze a single database or several databases, or a single database system or several database systems, or call up a service of these databases or of these database systems.

A "database", also called a "database system (DBS)" is a system for electronic data management. The main task of a database system consists in particular in storing large amounts of data in an efficient, consistent and durable manner and to provide required subsets to the user and to application programs, in various needs-oriented forms of presentation. Such application programs are here in particular provided to the user by means of the client.

A database system substantially consists of two parts, the management software, also referred to as database management system, and the volume of data to be managed, the database in the strict sense, which is also sometimes referred to as a data pool. The management software internally organizes the storage of the data and controls all read and write accesses to the database. The database system generally provides a database language for queries and management, which the client can here access either directly or, for example, via an intermediate layer, such as, for example, an XPA-layer. The databases or database systems are more specifically relational databases or relational database systems.

In order to implement server-side multitasking, the client-server system can more specifically have a load dispatcher and/or a database meta-description appliance, wherein the database meta-description appliance in particular allows for a unitary access to several databases and/or database systems.

The "load dispatcher" is also referred to as a scheduler. This load dispatcher can more specifically divide the computer resources between the individual clients. In this regard, the distribution can be carried out both respectively with constant time slices or depending on the called-up services.

The "database meta-description appliance" is in particular implemented by a database meta-description layer. A typical example of this database meta-description appliance is the software XPA, produced by the company Magic®, executed on a computer. Such a database meta-description layer in particular allows the addressing of heterogeneous databases or several databases in a unitary manner since the database meta-description device carries out an abstract representation and processing of the underlying databases/database systems.

For example, only the number of tables and the respective columns of the table are stored along with the respective storage type. The actual realization of the database is then addressed separately for each respective database so that the database meta-description appliance or layer only creates an environment via which different databases can be addressed in a unitary manner.

In an embodiment of the present invention, the database meta-description appliance or the load dispatcher can, for example, divide the server-side computer resources between the clients. An indirect access of the clients to the underlying databases is thus implemented.

In order to implement dynamically pre-emptive client-side multitasking, a dependence of a called-up service or of a result of a called-up service or of several called-up services or results of several called-up services on another service or on another result of a service can be taken into account during the client-side input-dependent distribution.

For example, two services called-up in parallel by an operator can influence each other so that, for example, a modification of a database field influences, for example, the result of an analysis through one of the services. The client-side distribution of the server-side attributed computer resources can in particular be adapted in this case.

Certain things can, for example, be processed in parallel processors or certain calculations during the analysis can be postponed to a later time, so that the modified database field is entered first and the final analysis is completed subsequently, in order to take this modified database field into account.

The client-server system and in particular the client can have a display device in order to be able to display certain results to the operator of a client. Such a display device can be a monitor or a display, for example, of a tablet or a smartphone.

In order to be able to show the jobs and processes operating in parallel to an operator of a client, a client can be set up so that a called-up service or a result of a called-up service or results of several called-up services are represented, in particular, by a tab structure, via the display device.

The statistical analysis of the database can, for example, be displayed in a first tab and the creation of a student and of the database fields that need to be manipulated to this end can be displayed in a second tab.

In order to be able to display structurally associated parallel running processes to an operator of a client, the client can be set up in such a manner that called-up interdependent services can be displayed in a related manner, in particular by a tab family structure, via the display device, so that a context-based representation can be implemented.

In a student management software program, the address of a student can, for example, be modified and an interim report can be printed at the same time. In so doing, the creation of the report can be displayed under the main tab and the address data to be modified can be displayed under an auxiliary tab (child or grandchild tab). Due to the fact that the address is currently being modified, the service compiles all the student's marks and corresponding credits but waits until the entry of the new address data has been completed, in order for the report to already feature the new address data.

It is thus clear to the operator that both services cannot be completed independently from each other and that they are associated.

In an embodiment, the present invention provides a terminal, in particular a laptop, a tablet, a cell phone, a smart watch or desktop-computer, which is set up to implement a client in a previously described client-server system.

The present invention is explained in more detail below based on exemplary embodiments shown in the drawings.

A client-server system 101 comprises an SQL database system 103 and an SAP database system 105. An XPA-layer of the company Magic® is disposed above the database systems 103, 105. A server load dispatcher 109 is implemented in the XPA-layer 107 by the associated XPA software. A first client 111, second client 113, and other clients 115 are associated with the XPA-layer 107 and the server load dispatcher 109. The first client 111, the second client 113, and the other clients 115 each respectively have one client load dispatcher 117.

The XPA-layer 107 forms an abstract representation of the underlying database systems 103, 105. Database queries or manipulations of the individual database systems 103, 105, and more specifically of the underlying tables and associated fields, can be carried out by way of client-side accesses.

Both the SQL database system 103 and the SAP database system 105 are located on different high-performance computers. The access is carried out via a network by the XPA-layer, which is in turn implemented by a computer. Since, in the present case, the XPA-layer controls the individual accesses, the corresponding computer resources of the computers of the underlying database systems 103, 105 are distributed to the corresponding clients 111, 113, 115.

The clients 111, 113, 115 are ordinary office-standard computers on which, in the present case, a university management software program is executed, which can be operated by the respective operators. In the present case, the underlying database system (DBS) is the SQL database system 103. In the present case, queries can also be made of a personnel database 105 (here the SQL-database system) in which the personnel data regarding the professors is stored and managed.

In the present case, the server load dispatcher 109 distributes the computer resources uniformly (in equal time intervals) to the clients 111, 113, 115, so that in particular the same access time to the computer of the XPA-layer and/or to the computers of the database systems 103, 105 is attributed to each client 111, 113, 115.

If an analysis is initiated, for example, on the first client 111, consisting, for example, of a search for current students, broken down by country, subjects and age, 80% of the time attributed to the client by the server load dispatcher 109 is now used on the client side for this job.

In parallel to this analysis, the operator of the first client 111, for example, adds a new student with their corresponding data. For this task, 20% of the time attributed by the server load dispatcher 109 is used.

If, for example, an interim report of a student is now additionally generated, the time attributed by the server load dispatcher 109 is distributed, for example, so that 60% of the time is used for the analysis, 30% for the creation of the interim report, and 10% for the creation of the student.

In particular during the distribution of time between the individual jobs, the system checks if an operator has initiated new jobs or tasks on the client side so that a new time distribution is then correspondingly carried out. Parallel and continuous operations can thereby be provided so that the operator of the client does not, for example, have to wait for the result of the analysis.

This not only allows for a novel, parallel operation, but it also makes it possible to provide the operator with a completely different representation.

An operator can thus be provided with a completely new graphic user interface (GUI) 231.

Dependent processes are in particular represented in a well-arranged manner. Dependent processes are jobs, queries or searches in the database which, in the present case, relate, for example, to a student, or in which certain database fields have an impact on another query or on another job. In a first step, a general query regarding a student is thus made. This query is then represented by way of the parent tab 245.

A modification of the master data regarding this student is additionally carried out. This is represented by means of the child tab 247.

In addition thereto, the operator additionally requests an interim report for this student. This process is represented via the grandchild tab 249.

A list of attended classes 247 related to the child tab 247 is created in parallel. If the child tab 247 with the list of attended classes is called up, the corresponding GUI 231 shows certain database fields 235 with certain additional pieces of user information 237.

A corresponding class is also allocated via a checkbox 233.

In the present case, other parallel jobs are carried out in parallel to the processes related to the student in the parent tab 245, which are represented by way of the tabs 241. These parallel jobs are here two different analyses.

The present invention is not limited to embodiments described herein; reference should be had to the appended claims.

LIST OF REFERENCE NUMERALS 101 client-server system
103 SQL database system
105 SAP Database system
107 XPA-layer
109 server load dispatcher
111 first client
113 second client
115 other clients
117 client load dispatcher
231 graphic user interface (GUI)
233 checkbox
235 database field
237 user information
241 tab
243 tab family
245 parent tab
247 child tab
249 grandchild tab

What is claimed is:

1. A client-server system comprising:
a server;
a plurality of clients; and
server-side computer resources which are allocated to the plurality of clients,
wherein,
the server-side computer resources are allocated to the plurality clients based on services requested by the plurality of clients, and
the server-side computing resources allocated to a particular client of the plurality of clients are input-dependently distributed by the particular client independently of the other plurality of clients dependent on at least one input to the particular client so as to implement a client-side and input-dependent multitasking.

2. The client-server system as recited in claim 1, wherein the client-side and input-dependent multitasking is a pre-emptive multitasking.

3. The client-server system as recited in claim 1, further comprising:
other clients,
wherein,
the server-side computer resources are further allocated to the other clients, and
the server-side computer resources are further input-dependently distributed by the other clients dependent on an input from at least one of the other clients so as to implement a client-side and input-dependent multi-tasking for the other clients.

4. The client-server system as recited in claim 3, wherein,
the server comprises at least one server service, and
at least one of the plurality of clients and the other clients is configured to directly or to indirectly call up the at least one server service.

5. The client-server system as recited in claim 4, wherein the server further comprises at least one database and/or at least one database system.

6. The client-server system as recited in claim 5, further comprising:
at least one of a load dispatcher and a database meta-description appliance which are configured to allow a unitary access to the at least one database and/or to the at least one database system.

7. The client-server system as recited in claim 6, wherein the at least one of a load dispatcher and a database meta-description appliance is further configured to distribute the server-side computer resources to the plurality of clients and to the other clients.

8. The client-server system as recited in claim 3, wherein at least one of the plurality of clients and the other clients comprises a display device.

9. The client-server system as recited in claim 8, wherein at least one of the plurality of clients and the other clients is configured so that requested interdependent services are displayed in a related manner via the display device so as to provide a context-based representation.

10. The client-server system as recited in claim 9, wherein the displaying in a related manner is provided by a tab family structure.

11. A terminal which is configured to implement the particular client in the client-server system as recited in claim 1.

12. The terminal as recited in claim 11, wherein the terminal is a laptop, a tablet, a cell phone, a smart watch, or a desktop computer.

* * * * *